A. T. GRIES.
AUTOMATIC SHUT-OFF VALVE.
APPLICATION FILED FEB. 4, 1909.
922,578.
Patented May 25, 1909.
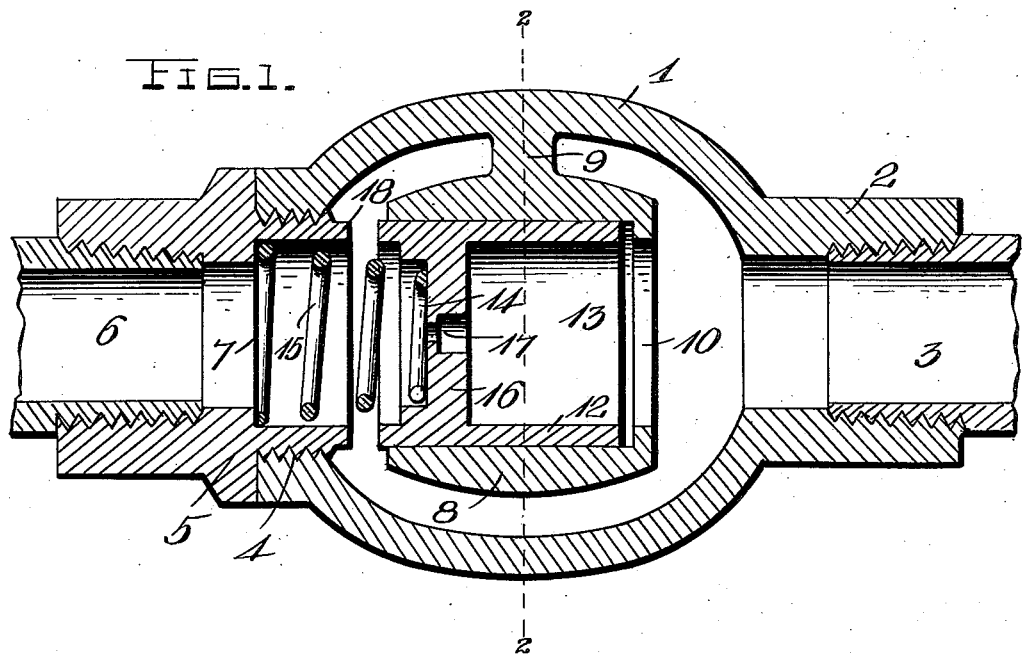
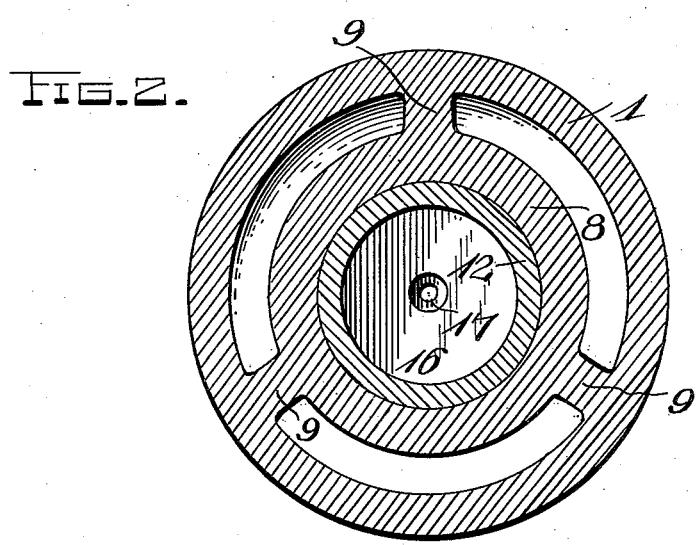
Witnesses
Inventor
A. T. Gries
By H. B. Willson & Co.
Attorneys

UNITED STATES PATENT OFFICE.

ALBERT THEADORE GRIES, OF TOLEDO, OHIO.

AUTOMATIC SHUT-OFF VALVE.

No. 922,578.

Specification of Letters Patent.

Patented May 25, 1909.

Application filed February 4, 1909. Serial No. 476,059.

*To all whom it may concern:*

Be it known that I, ALBERT THEADORE GRIES, a citizen of the United States, residing at Toledo, in the county of Lucas and State of Ohio, have invented certain new and useful Improvements in Automatic Shut-Off Valves; and I do declare the following to be a full, clear, and exact description of the invention, such as will enable others skilled in the art to which it appertains to make and use the same.

This invention relates to improvements in automatic cut off valves.

The object of the invention is to provide a valve of this character whereby when the pressure of the fluid passing through the valve is increased over a normal or predetermined point, the valve will automatically close.

A further object is to provide a valve of this character which will be simple, strong and durable in construction, efficient and reliable in operation and well adapted for the purpose for which it is desired.

With the foregoing and other objects in view, the invention consists of certain novel features of construction, combination and arrangement of parts as will be more fully described and particularly pointed out in the appended claim.

In the accompanying drawings, Figure 1 is a longitudinal sectional view of the valve showing the same in open position ; Fig. 2 is a cross sectional view on the line 2—2 of Fig 1.

In the embodiment of the invention, I provide a casing 1, on one end of which is formed an interiorly threaded coupling nipple 2, said nipple being adapted to receive the end of the fluid conducting pipe 3. The opposite or discharge end of the casing is formed with a threaded opening 4 in which is adapted to be screwed a tubular cap 5, the end of which is interiorly threaded, as shown, and in said threaded end is screwed the end of the fluid conducting pipe 6. The inner end of the cap 5 is enlarged to form a seat 7, the purpose of which will herein appear.

In the casing 1, is arranged a valve cylinder 8, said cylinder being supported concentrically within the casing by supporting lugs 9. In one end of the cylinder 8 is formed an inlet passage 10 and in the cylinder is slidably mounted a piston valve 12, which is formed with a recessed inner end 13. The outer end of the valve is also recessed as shown at 14 to provide a seat to receive the forward end of a valve opening spring 15. The opposite end of the spring 15 is engaged with the seat 7 formed in the cap 5. In the partition 16 dividing the recessed opposite ends of the valve is formed a relief port or passage 17. The inner end of the cap 5 projects into the casing 1 and forms a valve seat 18 with which the outer end of the valve is adapted to be engaged when the valve is forced to its closed position.

In the operation of the valve, the spring 15 will hold the valve open against the normal or usual pressure of the fluid passing through the valve casing. Should the pressure of the fluid become greater than normal, said pressure will automatically close the valve against the seat 18 thus cutting off the flow of fluid through the casing. The relief port 17 is formed in the valve to prevent an excess of pressure from bursting the valve casing or pipe.

My improved valve may be employed in connection with the safety appliances of railway cars or in any connection where it is desired to automatically cut off the supply of fluid when the pressure of the same has reached a point above normal.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim as new and desire to secure by Letters-Patent is:

A valve of the character described, comprising a casing, a fluid conducting pipe connected to one end of said casing, a tubular interiorly threaded cap adapted to be screwed into the opposite end of the casing, and having applied thereto the connecting section of said fluid conducting pipe, a valve seat formed on the inner end of said cap, a spring seat arranged in the cap, a valve cylinder concentrically secured in the casing, a valve slidably mounted in said cylinder, said valve having recessed opposite ends, and a relief port, a spring engaged with the outer recessed end of the valve and with the seat in said cap whereby the valve is held in open position against the normal pressure of the fluid passing through the valve casing, and whereby when said fluid enters said casing at a pressure greater than normal, said valve will be closed against the tension of said spring.

In testimony whereof I have hereunto set my hand in presence of two subscribing witnesses.

ALBERT THEADORE GRIES.

Witnesses:
 WILLIAM WHITTAN,
 WILLIAM RAMSEY.